US005579900A

United States Patent [19]
Pryor et al.

[11] Patent Number: 5,579,900
[45] Date of Patent: Dec. 3, 1996

[54] INSTRUMENT CLUSTER ASSEMBLY AND SWITCH ACTUATOR ASSEMBLY THEREFOR

[75] Inventors: Michael E. Pryor, Huntsville; Bradley S. Chupp, Madison; Emily A. Graffeo, Huntsville, all of Ala.

[73] Assignee: Chrysler Corporation, Auburn Hills, Mich.

[21] Appl. No.: 494,460

[22] Filed: Jun. 26, 1995

[51] Int. Cl.$^6$ .................................................. H01H 3/20
[52] U.S. Cl. .......................... 200/331; 200/317; 200/292; 200/310; 200/341
[58] Field of Search ..................................... 200/331, 329, 200/330, 332.1, 341, 292, 310, 215, 317, 312, 515

[56] References Cited

U.S. PATENT DOCUMENTS

| | | | |
|---|---|---|---|
| Re. 30,435 | 12/1986 | Fukao | 200/292 |
| 3,856,195 | 12/1974 | Kakizaki et al. | |
| 3,900,712 | 8/1975 | Fukao | |
| 3,983,341 | 9/1976 | Stanish | |
| 4,340,795 | 7/1982 | Arthur | |
| 4,441,001 | 4/1984 | Miyano et al. | 200/292 |
| 4,507,549 | 3/1985 | Secord | |
| 4,845,319 | 7/1989 | Watkins et al. | 200/292 |
| 5,008,505 | 4/1991 | Takano et al. | |
| 5,023,413 | 6/1991 | Staples | |
| 5,172,805 | 12/1992 | Gumb | |
| 5,201,408 | 4/1993 | Torma | 200/292 |
| 5,288,957 | 2/1994 | Swaybill | 200/317 |
| 5,373,132 | 12/1994 | Achermann et al. | 200/314 |
| 5,401,922 | 3/1995 | Asta | 200/512 |
| 5,471,023 | 11/1995 | Kaizu et al. | 200/292 |

FOREIGN PATENT DOCUMENTS 2046996  11/1980  United Kingdom ................ 200/292

*Primary Examiner*—David J. Walczak
*Attorney, Agent, or Firm*—Roland A. Fuller, III

[57] ABSTRACT

An automobile instrument cluster assembly includes a printed circuit board and a display unit coupled to the circuit board. The display unit includes a light source for displaying information. The instrument cluster further includes a switch having a depressible push-button moveable between an ON position and an OFF position for interacting with the displayed information. The instrument cluster further includes a switch actuator assembly having a plunger for moving the push-button between the ON and OFF positions. The switch actuator assembly further includes a plunger support member removably attached to the circuit board in a snap-fit arrangement for movably supporting the plunger.

7 Claims, 2 Drawing Sheets

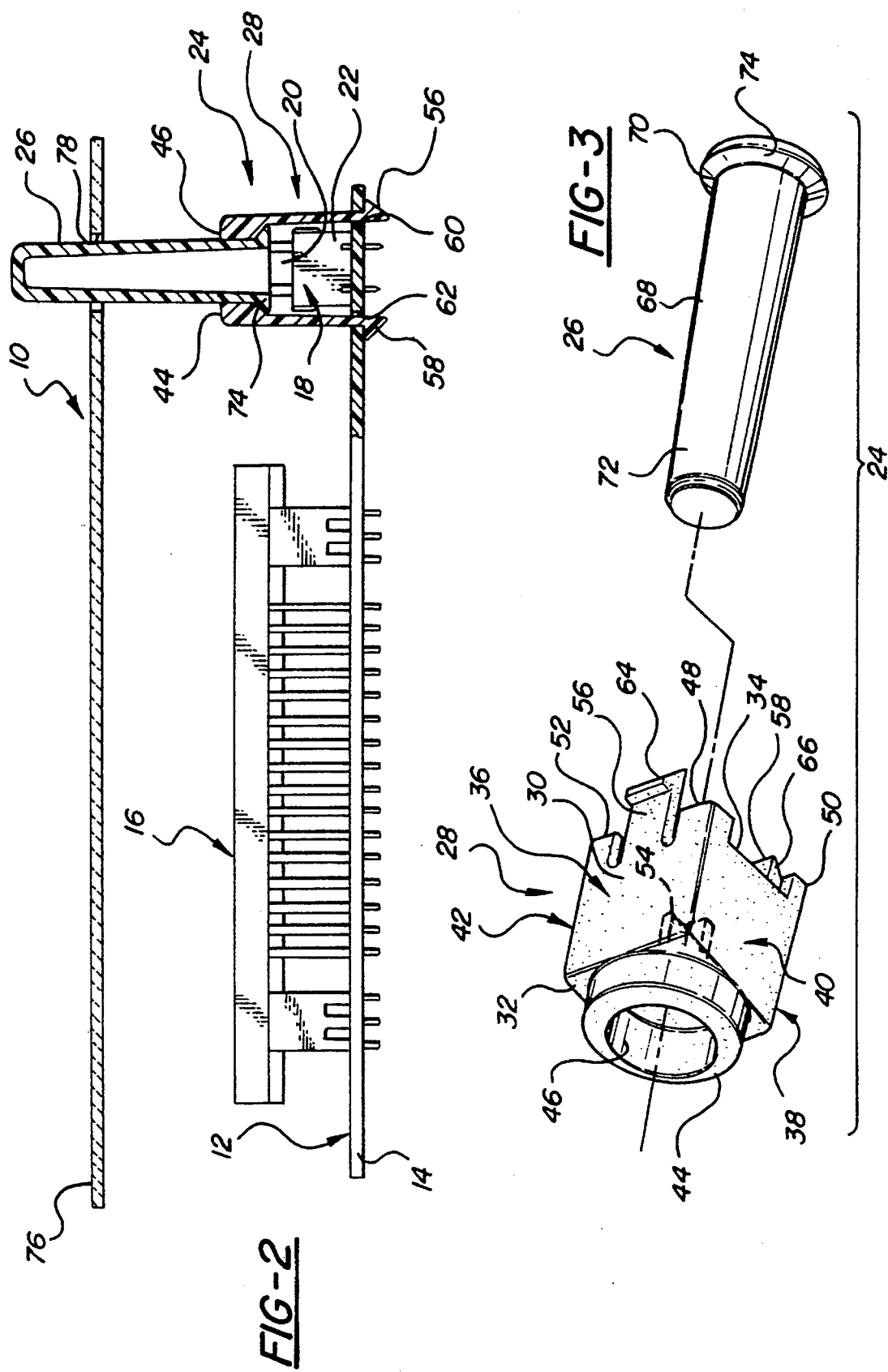

5,579,900

INSTRUMENT CLUSTER ASSEMBLY AND SWITCH ACTUATOR ASSEMBLY THEREFOR

FIELD OF THE INVENTION

This invention relates to instrument cluster assemblies for displaying information, and more particularly, to an instrument cluster assembly including a switch actuator assembly.

BACKGROUND OF THE INVENTION

Today's instrument cluster panels or assemblies include a printed circuit board and an electronic digital display unit coupled to the circuit board for displaying information, such as trip mileage or warning messages. The digital display unit includes a light source, such as florescent light, for illuminating the information to be displayed. It has become necessary to provide an electronic means, as opposed to a mechanical means, for interacting with the information to be displayed. For example, if the display unit is an odometer, it is necessary to provide an electronic reset for resetting or zeroing the odometer.

Typically, a push-button switch is mounted to the circuit board and electrically coupled to the odometer display unit for resetting the odometer. The push-button switch must be remotely actuated since the switch, circuit board and display unit are positioned behind a cover enclosing the same. It then becomes necessary to provide a switch actuator assembly which allows an operator to actuate the push-button switch from a location remote from the push-button switch.

Switch actuator assemblies usually require additional parts, such as screws or the like, for fastening to the printed circuit board and/or are not free-standing or self-supporting. This, in turn, increases assembly time and cost.

SUMMARY OF THE INVENTION

The present invention provides a free-standing, self-supporting switch actuator assembly for an instrument cluster which requires no separate fastening parts or devices.

More specifically, the present invention provides an instrument cluster assembly including a circuit board and a display unit coupled to the circuit board. The display unit includes a light source for displaying information. The instrument cluster assembly further includes a switch secured to the circuit board and electrically coupled to the display unit for interacting with the displayed information. The switch includes a depressible, push-button movable between an ON position and an OFF position. The instrument cluster assembly further includes a switch actuator assembly for moving the push-button between the ON and OFF positions. The switch actuator assembly includes a plunger movable relative to the push-button, so as to move the push-button between the ON and OFF positions and a plunger support member secured to the circuit board for movably supporting the plunger.

The present invention also provides a snap-fit arrangement for removably attaching the switch actuator assembly to the circuit board of the instrument cluster assembly.

These and other features and advantages of the invention will be more fully understood from the following detailed description of the invention taken together with the accompanying drawings.

BRIEF DESCRIPTION OF THE DRAWINGS

In the drawings:

FIG. 2 is a cross-sectional view of the instrument cluster assembly shown in FIG. 1 taken about line 2—2; and FIG. 3 is a perspective view of the switch actuator assembly of the instrument cluster assembly shown in FIG. 1.

DETAILED DESCRIPTION OF THE INVENTION

Figure 1:
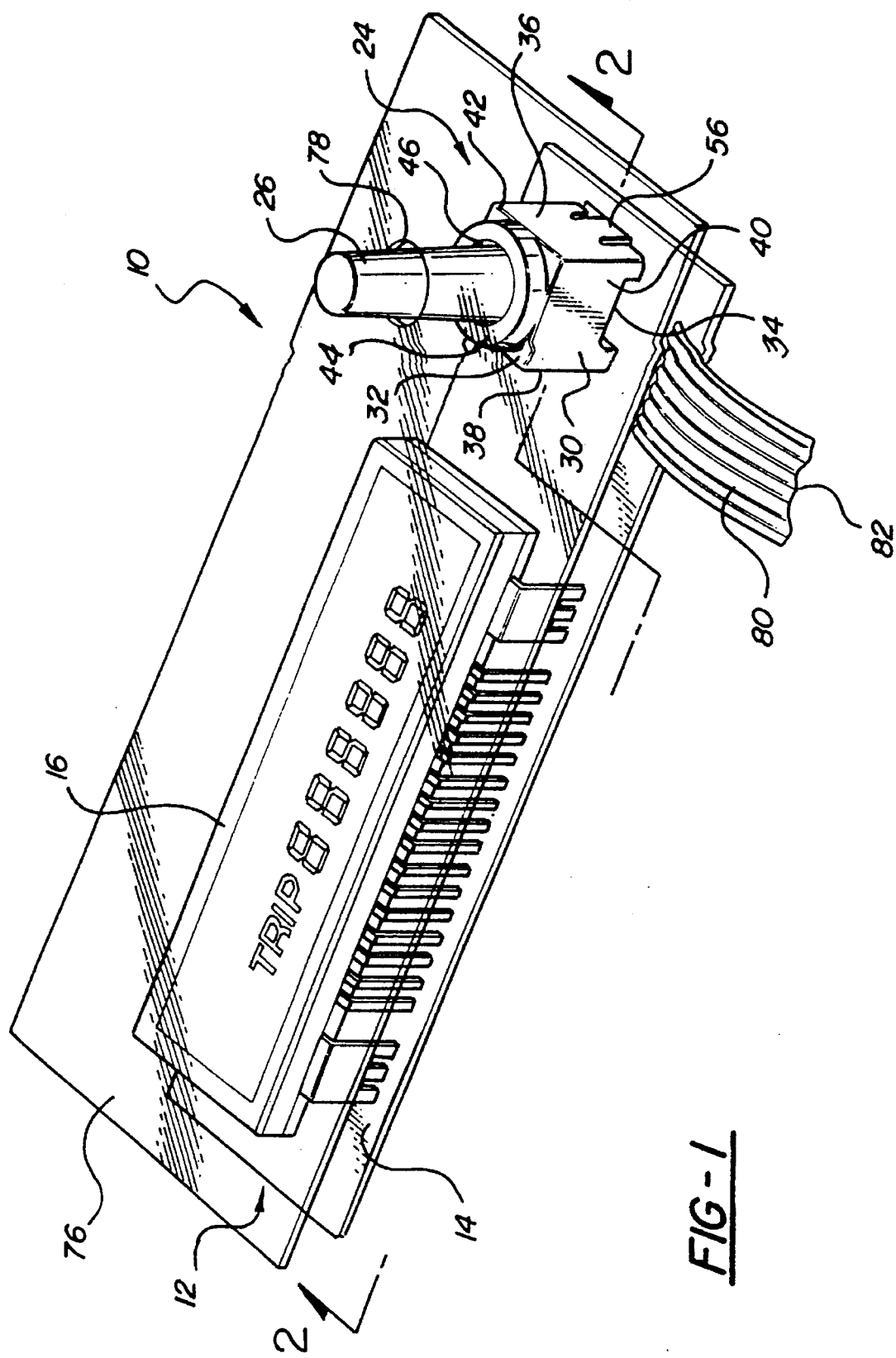
FIG. 1 is a perspective view of an instrument cluster according to the invention.

Referring now to FIGS. 1–3 of the drawings in detail, numeral 10 generally indicates an instrument cluster assembly including a circuit board 12 having a substrate 14. Preferably, circuit board 12 is a printed circuit board having embedded electrical conductors therein. Instrument cluster assembly 10 further includes a display unit 16 coupled to circuit board 12. Preferably, display unit 16 is a vacuum florescent display unit sold by Futaba Corporation of America, P.O. Box 6163, 101 Electronics Boulevard, Huntsville, Ala. 35824. Display unit 16 includes a light source (not shown) for displaying information such as trip mileage or warning messages. In the preferred embodiment, display unit 16 is an odometer.

As seen in FIG. 2, instrument cluster assembly 10 further includes a switch 18. Switch 18 is mounted to circuit board 12 and electrically coupled to display unit 16 for interacting with the displayed information. Switch 18 includes a depressible push-button 20 and a body portion 22. Push-button 20 is movable relative to body portion 22 between an ON position, wherein the push-button 20 is fully depressed, and an OFF position, wherein the push-button 20 is fully extending from body portion 22 (as shown in FIG. 2). Switch 18 includes a spring (not shown) which biases the push-button 20 towards the OFF position.

Instrument cluster assembly 10 further includes a switch actuator assembly 24 for moving push-button 20 between the ON and OFF positions. Switch actuator assembly 24 includes a plunger 26 movably engageable with push-button 20 so as to move push-button 20 between the ON and OFF positions. Switch actuator assembly 24 further includes a plunger support member 28 secured to circuit board 12 for movably supporting plunger 26. Plunger support member 28 covers or surrounds switch 18 and push-button 20. Plunger support member 28 includes a hollow main body 30 having a first end 32 and a second end 34. In the preferred form, main body 30 is rectangular and includes first and second opposing side walls 36, 38 and third and fourth opposing side walls 40, 42. Plunger support member 28 further includes a cylindrical member 44 formed integrally with main body 30. Cylindrical member 44 projects upwardly from first end 32 and includes a central guide opening 46 for receiving plunger 26.

Support member 28 further includes a plurality of legs 48, 50, 52, 54 formed integrally with main body 30 and projecting downwardly from second end 34 for supporting main body 30 on circuit board 12. Legs 48, 50, 52, 54 are positioned at the corners of second end 34 of main body 30. Support member 28 further includes first and second flexible or resilient locking members 56, 58 formed integrally with main body 30 and projecting downwardly from second end 34 for removably locking plunger support member 28 to circuit board 12. First locking member 56 is positioned between the corners 48, 52 of main body 30 and extends downwardly from first side wall 36. Second locking member 58 is positioned between the corners 50, 54 of main body 30 and extends downwardly from second opposing sidewall 38.

Circuit board 12 includes slots 60, 62 extending through substrate 14. First and second locking members 56, 58 are adapted to be received in slots 60, 62, respectively, for removably locking plunger support member 28 to circuit board 12. First and second locking members 56, 58 include flanged portions 64, 66 for snap-fit engagement with substrate 14 of circuit board 12. Plunger 26 includes a hollow cylindrical member 68 having a first end 70 and a second end 72. Plunger 26 includes a flange 74 extending radially from first end 70 for preventing removal of plunger 26 from plunger support member 28 when switch actuator assembly 24 is assembled and secured to circuit board 12. Hollow cylindrical member 68 extends through central guide opening 46 and flange 74 is positioned between push-button 20 and cylindrical member 44 of main body 30, as seen in FIG. 2. In the OFF position, flange 74 abuts cylindrical member 44 as seen in FIG. 2. In the ON position, flange 74 abuts body portion 22. Upon assembly, push-button 20 biases plunger 26 to the OFF position as flanged portions 64, 66 are snapped into slots 60, 62.

Instrument cluster assembly 10 further includes a housing 76 for housing circuit board 12, display unit 16, switch 18 and switch actuator assembly 24. Plunger 26 extends through an opening 78 in housing 76 to enable actuation of switch 18 from outside of housing 76 and remote from push-button 20. In the case that display unit 16 is an odometer, plunger 26 acts as a reset knob wherein switch 18 is used to reset the odometer to a zero position when the push-button 20 is in the ON position.

Finally, as seen in FIG. 1, instrument cluster assembly 10 includes an electrical cable 80 coupled to circuit board 12 and an electrical connector 82 coupled to the electrical cable 80. Electrical cable 80 and electrical connector 82 may be used to link circuit board 12, display unit 16 and switch 18 to a power source, other instrument cluster components, or the like.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An instrument cluster assembly, said assembly comprising:

a circuit board;

a display unit including a trip odometer mounted on and electrically coupled to said circuit board and operative to display character defined resettable trip mileage information;

a reset switch secured to said circuit board and spaced adjacent and electrically coupled to said display unit for resetting the displayed trip mileage information, said switch including a depressible push-button movable between an ON position and an OFF position;

a switch actuator assembly for moving said push-button between said ON and OFF positions, said switch actuator assembly including a plunger engaging and movable with said push-button so as to move said push-button between said ON and OFF positions and a plunger support member secured to said circuit board for movably supporting said plunger;

said instrument cluster assembly including a transparent housing covering without supporting said circuit board, said display unit, said switch, and said switch actuator assembly;

wherein said plunger extends through an opening in said housing to thereby allow actuation of said switch from outside of said housing.

2. The instrument cluster assembly as in claim 1 wherein said plunger support member includes:

a hollow main body having a first end and a second end;

a cylindrical member formed integrally with said main body and projecting upwardly from said first end, said cylindrical member having a central guide opening for receiving said plunger;

a plurality of legs formed integrally with said main body and projecting downwardly from said second end for supporting said main body on said circuit board; and at least one flexible locking member formed integrally with said main body and projecting downwardly from said second end for removably locking said plunger support member to said circuit board.

3. The instrument cluster assembly as in claim 2 wherein said main body is rectangular and includes first and second opposing side walls and third and fourth opposing side walls.

4. The instrument cluster assembly as in claim 3 wherein said legs are positioned at the corners of said rectangular main body.

5. The instrument cluster assembly as in claim 3 wherein said plunger support member includes a first locking member positioned between adjacent corners of said first side wall and extending downwardly therefrom and a second locking member positioned between adjacent corners of said second opposing side wall and extending downwardly therefrom.

6. The instrument cluster assembly as in claim 1 wherein said plunger includes a hollow cylindrical member having a first end and a second end.

7. The instrument cluster assembly as in claim 6 wherein said plunger includes a flange extending radially from said first end for preventing removal of said plunger from said plunger support member when said switch actuator assembly is assembled and secured to said circuit board.

* * * * *